US00H002089H

(19) United States

(12) Statutory Invention Registration

Cormier et al.

(10) Reg. No.: US H2089 H

(43) Published: Nov. 4, 2003

(54) COMPOSITIONS USEFUL FOR DEGREASING METAL SURFACES

(75) Inventors: Gerald J. Cormier, Oxford, MI (US); Michael L. Sienkowski, Warren, MI (US)

(73) Assignee: Henkel Corporation, Gulph Mills, PA (US)

(21) Appl. No.: 09/631,163

(22) Filed: Aug. 3, 2000

Related U.S. Application Data

(60) Provisional application No. 60/146,993, filed on Aug. 3, 1999.

(51) Int. Cl.[7] ..... C11D 1/00

(52) U.S. Cl. ..... 510/245

*Primary Examiner*—Michael J. Carone

*Assistant Examiner*—Aileen B. Felton

(74) *Attorney, Agent, or Firm*—Wayne C. Jaeschke; Stephen D. Harper

(57) ABSTRACT

Metal surfaces are effectively cleaned of grease and oil using an aqueous composition containing surfactant, alkalinizing agent, metal corrosion inhibitor, brightening agent and relatively high levels of glycol ether.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITIONS USEFUL FOR DEGREASING METAL SURFACES

This application claims the benefit of Provisional Application No. 60/146,993, filed Aug. 3, 1999.

BACKGROUND OF THE INVENTION

Field of the Invention

This invention pertains to aqueous compositions capable of removing grease and other oily substances from metal surfaces.

Problem to be Solved

In preparing metal surfaces for the application of paint or other coatings, it will often be necessary to treat such surfaces to remove oily materials present as contaminants. For example, mill finish aluminum, such as the 6111 grade aluminum supplied by Alcoa for use by the automotive industry as car body panels, is difficult to clean using conventional alkaline cleaners and degreasers used in the industry in that such cleaners do not produce a water-wettable surface after cleaning. The non-wettable surface cannot be adequately pretreated with phosphate and the pretreated surface does not uniformly accept electrodeposition paint coverage. The resulting surface is rough and requires light sanding in order to obtain a color top coating of acceptable quality.

SUMMARY OF THE INVENTION

A composition useful for degreasing a metal surface is provided which comprises water, at least one surfactant, at least one alkalinizing agent, at least one metal corrosion inhibitor, at least one brightening agent, and at least one glycol ether. To obtain consistently high cleaning performance, it is critical to use a relatively high concentration of glycol ether (e.g., at least about 12 percent by weight, more preferably, at least about 15 percent by weight, most preferably at least about 18 percent by weight).

DETAILED DESCRIPTION OF THE INVENTION

Although the glycol ether may be any of the known monoethers of dihydroxy compounds known in the art, it is preferred that the dihydroxy compounds be aliphatic in character. Additionally, it is preferred that the dihydroxy compound comprise one or more oxyethylene and/or oxypropylene units. For example, the dihydroxy compound may be ethylene glycol, diethylene glycol, triethylene glycol, propylene glycol, dipropylene glycol or tripropylene glycol or a mixed oligomer of ethylene and propylene glycols. The dialkylene glycols are especially preferred. The use of relatively short chain (e.g., C1–C6) alkyl ethers is also preferred, particularly C3 and C4 alkyl ethers (e.g., n-propyl, n-butyl). Mixtures of different glycol ethers may also be used. Particularly preferred glycol ethers include dipropylene glycol n-propyl ether and diethylene glycol butyl ether and mixtures thereof.

Where the metal surface requires brightening (as is often encountered with non-deoxidized aluminum and zinc alloy surfaces), it will be desirable to incorporate one or more metal brightening agents. The metal brightening agent or agents may be any of the substances known in the metal finishing art to be capable of brightening metal surfaces, although salts of citric acid and the like are especially preferred. Phosphate salts such as sodium or potassium ortho phosphate may also be utilized as brightening agents. Typically, the degreasing composition will contain from, about 1 to about 10 parts by weight of brightening agent(s). Excessive amounts should be avoided, however, as etching of both zinc and aluminum surfaces may occur. Etching renders the surface resistant to acceptance of a uniform phosphate coating.

To get faster wetting of the metal surface to be cleaned, it is advantageous to include one or more surfactants; surfactants alone, however, will not produce an easily water-wettable surface. Relatively low foaming surfactants which can be readily removed by rinsing are generally preferred since the degreaser composition will typically be applied at about room temperature by spraying. Alkylphenol alkoxylates such as nonylphenol ethoxylate are one example of a suitable type of surfactant. Alkoxylated alcohols, such as the non-ionic, low foam surfactants sold by Henkel Corporation under the trademark TRYCOL, are also suitable for use. Amphoteric surfactants such as caprylamphoproprionate are another type of surfactant which can be used, which in addition to improving the wettability of the metal surface help to stabilize the composition and prevent phase separation with changes in temperature. Typically, from about 1 to about 10 percent by weight surfactant will be sufficient for purposes of the present invention.

One or more metal corrosion inhibitors should also be added to the degreaser composition, typically at a level of from about 0.2 to about 2 weight percent total. These metal corrosion inhibitors help prevent excessive wear and tear on the metal surfaces of the equipment through which the composition is passed or circulation when being used. Particularly preferred metal corrosion inhibitors include salts of boric acid (e.g., borax) and nitrite salts (e.g., sodium nitrite) and mixtures thereof.

An amount of an alkalinizing agent should be added to the degreaser composition which is sufficient to render the composition basic. Sodium hydroxide or potassium hydroxide or the like may be used for this purpose. For example, about 5 to about 15 parts by weight of 45% liquid caustic potash may be incorporated in the composition.

Water is employed as the carrier or solvent for the other components of the composition. The types and amounts of the different components should be selected and adjusted such that the resulting composition is homogeneous and stays as a single phase over the temperature range encountered during storage and use (typically, about 10 degrees C. to about 40 degrees C.).

A specific example of a preferred formulation in accordance with the present invention is as follows:

| | |
|---|---|
| Deionized Water | 62.68 wt % |
| Citric Acid | 4.50 wt % |
| DOWANOL DB (1) | 19.00 wt % |
| AMPHOTERGE KJ-2 (2) | 4.50 wt % |
| TERGITOL NP-9 (3) | 0.50 wt % |
| Liq. Caustic Potash, 45% | 8.10 wt % |
| Borax | 0.36 wt % |
| Sodium Nitrite | 0.36 wt % |

(1) diethylene glycol monobutyl ether supplied by Dow Chemical
(2) caprylamphopropionate surfactant supplied by Lonza, Inc.
(3) nonylphenol ethoxylate (9 EO) surfactant supplied by Union Carbide Corporation The degreaser composition is suitable for use on all metals commonly encountered in an automobile assembly plant such as steel, zinc alloys, aluminum, aluminum alloys and the like. The application time (the time during which the composition is contacted with the metal surface) is best kept within the range of about 0.5 to about 2 minutes to avoid excessive cleaning and possible staining of the surface, particularly where the surface is comprised of a zinc alloy. The composition may be applied by spraying, dipping, wiping, brushing, rolling, or other suitable means and then removed by rinsing or exposure to a different type of aqueous composition.

For example, the degreaser compositions of the present invention may be employed in a painting operation as follows:

1) The degreaser composition is applied to a metal surface by misting or spraying and permitted to remain in contact with the surface for up to 2 minutes.
2) The metal surface is subjected to an alkaline cleaning using spray or immersion techniques and an alkaline cleaner such as the PCL 1523 cleaner supplied by the Surface Technologies Division of Henkel Corporation. The cleaning time during this step may be from about 0.5 minutes to about 3 minutes or more.
3) The metal surface is rinsed with water (ambient or at a temperature up to about 40 degrees C.). At this point in the process, the metal surface should have a 100 % water break-free surface for at least 30 seconds after ceasing the water rinse (i.e., the water coating the metal surface should remain as a continuous layer).
4) The metal surface is treated with a titanium conditioner such as the FIXODINE Z8 or FIXODINE ZL supplied by the Surface Technologies Division of Henkel Corporation.
5) The metal surface is treated with phosphate such as the trication phosphate product sold under the designation B958 by the Surface Technologies Division of Henkel Corporation.
6) The metal surface is rinsed with cold water for at least 30 seconds.
7) Optionally, the metal surface is post treated with a further rinse (which may contain chrome or which be chrome-free) such as one of the products sold by the Surface Technologies Division of Henkel Corporation under the designation PLN 90, PLN 60 or PLN 76. If this optional rinse step is taken, the metal surface is further rinsed with deionized water.
8) Paint is applied to the metal surface by electrocoating or other such methods.

When a metal surface is treated in accordance with the present invention, phosphate coverage on the surface is much more uniform and the crystal size is reduced as evidenced by SEM micrographs.

What is claimed is:

1. A composition useful for degreasing a metal surface comprising:

a) water;
b) at least one surfactant;
c) at least one alkalinizing agent;
d) at least one metal corrosion inhibitor;
e) at least one brightening agent;
f) at least one glycol ether, said glycol ether comprising at least 12 weight percent of the composition.

* * * * *